8932X
C. Hill,
Rotary Steam Engine.
Patented June 26, 1836.
NO PRINTED SPECIFICATION AVAILABLE
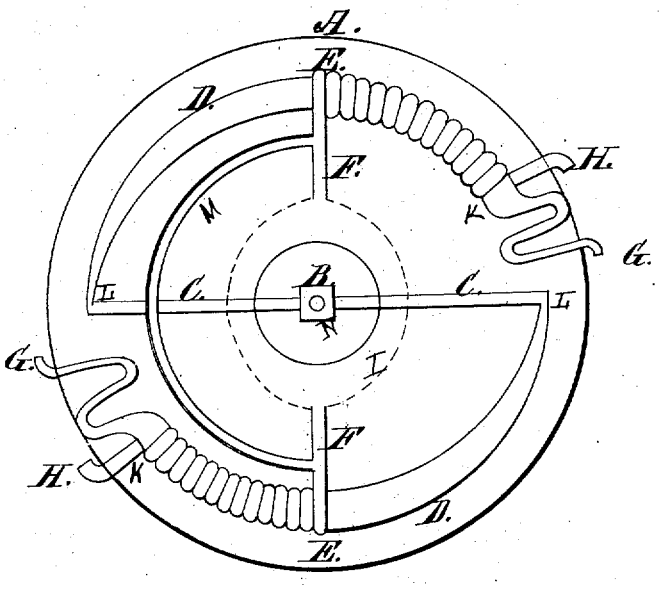

8932X

Ni 73
June 26, 1835 141

Charles Hill
Letters Patent

The Schedule referred to in these Letters Patent and making part of
the same containing a description in the words of the said Charles Hill
himself of his improvement in the Rotary Steam Engine operating up
on the principle of reaction

---

To all whom it may concern. Be it known that I Charles Hill of Zanes-
ville in the state of Ohio have invented certain improvements in the Ro-
tary Steam Engine operating upon the principle of reaction and that the
following is a full and exact description of my said improvements.
Fig 1 in the accompanying drawing represents the general plan and arrange-
ment of my improved engine, the various parts however being susceptible
of numerous modifications whilst the principle of its action remains un-
changed. A represents a revolving wheel, within which is contained various
parts as hereinafter described. B. is a hollow shaft, to which the wheel is
attached, sufficiently supported at the ends and receiving steam from a boil-
er through a connecting pipe at N. and there kept steam tight by means
of a stuffing box or otherwise C.C. are small steam pipes leading in opposite
directions from the hollow shaft towards the periphery of the wheel and well pro-
tected by nonconducting coverings. L.L. are the contracted commencements
of the pipes D.D. which pipes D.D. lead from the pipes C.C. in a curve corres-
ponding to the periphery of the wheel, and enlarge to any desired dimen-
sions. E.E. are continuations of the same steam pipes in connexion with
the water pipes H.H. herein after described. K.K. are continuations of the
same steam pipes in serpentine courses suitably contracted terminating beyond
the periphery of the wheel, at G.G. with issues at right angles therewith and
opposite to its direction. I. is a circular opening on one side of the wheel
into which water is conveyed by means of a pipe or otherwise from a reservoir
a pump. H.H are water pipes leading in opposite directions from the open-
ing I. to E.E. where the said water pipes assume spiral forms respective-
ly to K.K. constituting parts of the steam pipes from E.E. to K.K. as here
tofore

8932X tofore mentioned. The said water pipes continue from thence to their termin-
ations at H. H. beyond the periphery of the wheel terminating with issues
the same as those of the steam pipes at G. G. The water pipes from E. E. to H.
H. may surround the steam pipes encasing the same or pass within them
or be continued in any manner which will present a sufficient surface
for the condensation of the steam. The water pipes are connected by a pipe M.
for the purpose of equalizing the quantity of water in the pipes F. F. the revolv-
ing wheel may be enclosed in a casing of wood or metal of a circular or
other form within which the water and condensed steam may escape
and from thence be conveyed as convenience may direct. The wheel may
be likewise used as a condensor by means of water applied to its outer
surface. dispensing with the water pipes as described and terminating
the steam pipes at E. E. but still using a serpentine conveyance for the
condensed steam as in Fig 1 The whole may then be enclosed within a casing
as before. Instead of allowing the steam to escape from a fixed boiler
through a steam tube at the top I sometimes allow the whole boiler to
revolve with the wheel. In this case the steam tube extends out from the cen-
tre of one head of the boiler. their axes coinciding with each other. This
pipe then constitutes the shaft to which the wheel A. is affixed as in
Fig 1. The other end of the boiler is supported upon a hollow gudgeon
through which water is to be supplied. The whole quantity of water contain-
ed therein at any one time may be small the over heating the boiler being
prevented by the constant diffusion of the water over its inner surface.
Mode of Operation. The steam from a boiler entering a revolving shaft at
N. passes through the pipes C. C. and the contracted points L. L. to the en-
larged pipes D. D. The enlargement of these pipes reduces the velocity of
the steam and proportionally increases the surface against which reac-
tion takes place. The extremely rapid motion which would be necessary
to ensure the full application of the steam if allowed to escape immedi-
ately from the contracted points is thereby avoided. The steam arriving
at E. E. comes in contact with the exposed surface of the cold water
pipes and is condensed creating a vacuum and the condensed steam
is thrown out by its centrifugal force at the issues G. G. The condensed
steam

8432X steam within the serpentine pipe will by means of the centrifugal force
maintain the vacuum against the outward pressure of the atmosphere there-
by increasing the effective power of the steam fifteen pounds to the inch.
Water is introduced at the opening I, in sufficient quantity for the purpos-
es of the engine and is thrown by its centrifugal force through the proper
tubes and by its reaction at the issues H. H. compensates for the power
which is expended in giving it momentum. Air may be used separately
or in connexion with water for condensing the steam with suitable alter-
ations of the opening I, and the tubes connected therewith. What I claim
as my invention in the herein before described machine is the principle
of increasing the surface of reaction and diminishing the motion without
diminishing the power of the steam which is effected by the enlargement
of the steam pipes (as at D. D.) and the vacuum created by the condensa-
tion of the steam giving a less velocity to the wheel accompanied with a
corresponding increase of power. I also claim as my invention the in-
troduction of water and air either separately or in connexion, for the
purpose of creating the vacuum, and the manner of introducing and
disposing of the same, together with the manner of disposing of the steam
so as to assist in maintaining the vacuum. And I also claim as my
invention the application of the principles to attain the object herein set
forth whether the same be effected in the precise manner described or
otherwise Charles Hill Witnesses
W. C. Pelham
A. C. Ross (Drawing)

1105 [illegible]

Ex
Chf.